United States Patent Office 3,823,180
Patented July 9, 1974

3,823,180
5,6-TRANS $PGF_{2\alpha}$ AND $PGF_{2\beta}$
Frank H. Lincoln, Jr., Portage, and John E. Pike, Kalamazoo, Mich., assignors to The Upjohn Company, Kalamazoo, Mich.
No Drawing. Application June 28, 1971, Ser. No. 157,651, now Patent No. 3,759,978, which is a continuation-in-part of abandoned application Ser. No. 72,511, Sept. 15, 1970. Divided and this application Apr. 23, 1973, Ser. No. 353,479
Int. Cl. C07c 61/32, 69/74
U.S. Cl. 260—468 D
11 Claims

ABSTRACT OF THE DISCLOSURE 5,6-Trans-prostaglandins $E_2$, $F_{2\alpha}$, $F_{2\beta}$, $A_2$, and $B_2$ are disclosed. These are useful for the same pharmacological purposes as the known prostaglandins $PGE_2$, $PGF_{2\alpha}$, $PGF_{2\beta}$, $PGA_2$, and $PGB_2$.

CROSS REFERENCE TO RELATED APPLICATIONS

This application is a division of application Ser. No. 157,651, filed June 28, 1971, now Pat. No. 3,759,978, which is a continuation-in-part of our co-pending application Ser. No. 72,511, filed Sept. 15, 1970, now abandoned.

DESCRIPTION OF THE INVENTION

This invention relates to novel compositions of matter, to novel methods of producing those, and to novel chemical intermediates useful in those processes. This invention is more specifically concerned with novel organic compounds of the formula:

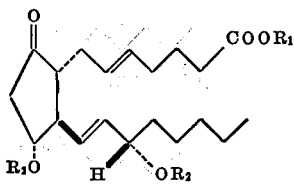

wherein $R_1$ is hydrogen or methyl, and wherein both $R_2$'s are hydrogen or acetyl, said compound being essentially free of the other components of the colonies of the subclass Octocorallia, and the pharmacologically acceptable salts thereof when $R_1$ is hydrogen.

This invention is also concernedw ith novel racemic compounds consisting of Formula I and the mirror image thereof, wherein $R_1$ and $R_2$ are as defined above; and the pharmacologically acceptable salts thereof when $R_1$ is hydrogen.

This invention is also concerned with novel racemic compounds of the formula:

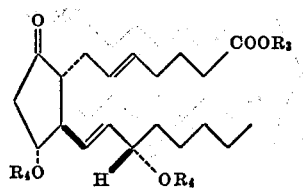

or a racemic compound of that formula and the mirror image thereof, wherein $R_3$ is hydrogen or alkyl of one to 8 carbon atoms, and wherein all $R_4$'s are hydrogen, formyl, or alkanoyl of 2 to 8 carbon atoms, inclusive, with the proviso that when $R_3$ is hydrogen or methyl, $R_4$ is not hydrogen or acetyl; and the pharmacologically acceptable salts thereof when $R_3$ is hydrogen.

This invention is also concerned with novel organic compounds of the formula:

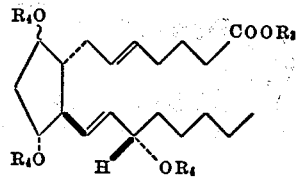

or a racemic compound of that formula and the mirror image thereof, wherein $R_3$ is hydrogen or alkyl of one to 8 carbon atoms, wherein all $R_4$'s are hydrogen, formyl, or alkanoyl of 2 to 8 carbon atoms, inclusive, and wherein $\sim$ indicates attachment of hydroxy to the cyclopentane ring in alpha or beta configuration; and the pharmacologically acceptable salts thereof when $R_3$ is hydrogen.

This invention is also concerned with novel organic compounds of the formula:

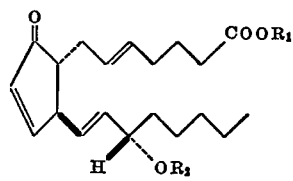

wherein $R_1$ and $R_2$ are as defined above, said compound being essentially free of the other components of colonies of the subclass Octocorallia, and the pharmacologically acceptable salts thereof when $R_1$ is hydrogen.

This invention is also concerned with novel racemic compounds consisting of Formula IV and the mirror image thereof, wherein $R_1$ and $R_2$ are as defined above; and the pharmacologically acceptable salts thereof when $R_1$ is hydrogen.

This invention is also concerned with novel organic compounds of the formula:

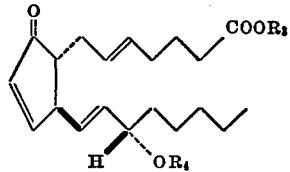

or a racemic compound of that formula and the mirror image thereof, wherein $R_3$ is hydrogen or alkyl of one to 8 carbon atoms, and wherein $R_4$ is hydrogen, formyl, or alkanoyl of 2 to 8 carbon atoms, inclusive, with the proviso that when $R_3$ is hydrogen or methyl, $R_4$ is not hydrogen or acetyl; and the pharmacologically acceptable salts thereof when $R_3$ is hydrogen.

This invention is also concerned with novel organic compounds of the formula:

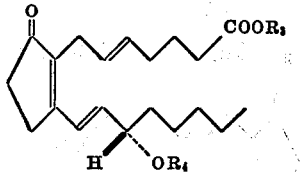

or a racemic compound of that formula and the mirror image thereof, wherein $R_3$ is hydrogen or alkyl of one to 8 carbon atoms, and wherein $R^4$ is hydrogen, formyl, or alkanoyl of 2 to 8 carbon atoms, inclusive; and the pharmacologically acceptable salts thereof when $R_3$ is hydrogen.

This invention is also concerned with the 15β epimers of the above Formula-I-to-VI compounds, i.e. wherein the —OH, —OR$_2$, or —OR$_4$ groups on C15 are in the beta configuration instead of the alpha (natural) configuration, as will be further discussed below.

These novel compounds of Formulas I to VI, inclusive, and their 15β epimers are derivatives of prostanoic acid which has the following structure and atom numbering:

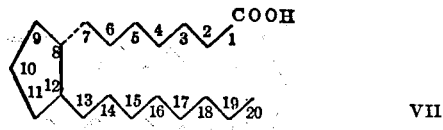  VII

Various derivatives of prostanoic acid are known in the art. These are called prostaglandins. See, for example, Bergstrom et al., Pharmacol. Rev. 20, 1 (1968), and references cited therein. For example, prostaglandin E$_1$ (PGE$_1$) has the following structure:

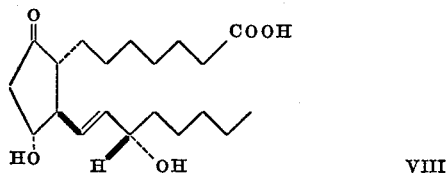  VIII

Prostaglandin E$_2$ (PGE$_2$) has the following structure:

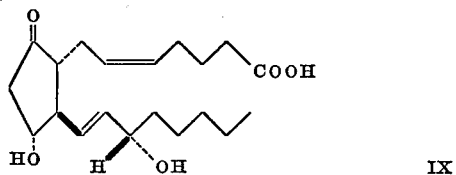  IX

Prostaglandin F$_{2\alpha}$ (PGF$_{2\alpha}$) has the following structure:

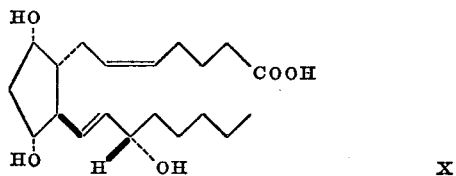  X

Prostaglandin F$_{2\beta}$ (PGF$_{2\beta}$) has the following structure:

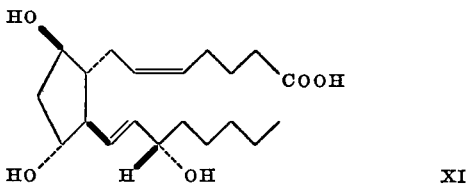  XI

Prostaglandin A$_2$ (PGA$_2$) has the following structure:

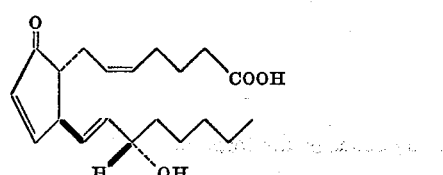  XII

Prostaglandin B$_2$ (PGB$_2$) has the following structure:

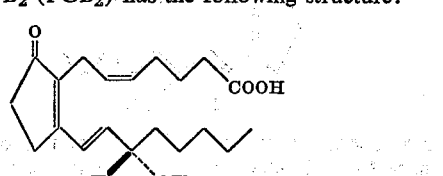  XIII

In Formulas VIII to XIII, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring. The side-chain hydroxy at C-15 in Formulas VIII to XIII is in S configuration. See Nature, 212, 38 (1966) for discussion of the stereochemistry of the prostaglandins.

Prostaglandins F$_{1\alpha}$, F$_{1\beta}$, A$_1$, and B$_1$ corresponding to PGE$_1$ are also known.

It will be observed that the difference between a PG$_1$ and a PG$_2$ is the presence in the latter of a cis carbon-carbon double bond between C-5 and C-6 (see Formula I).

Molecules of the known prostaglandins each have several centers of asymmetry, and can exist in racemic (optically active) form and in either of the two enantiomeric (optically active) forms, i.e., the dextrorotatory and levorotatory forms. As drawn, Formulas VIII to XIII each represent the particular optically active form of the prostaglandin which is obtained from certain mammalian tissues, for example, sheep vesicular glands, swine lung, or human seminal plasma, or by carbonyl and/or double bond reduction of a prostaglandin so obtained. See, for example, Bergstrom et al., cited above.

Each of the novel prostanoic acid derivatives of this invention is encompassed by one of the following formulas:

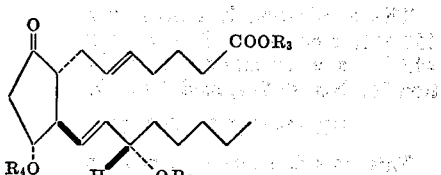  XIV

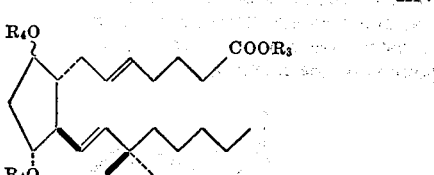  XV

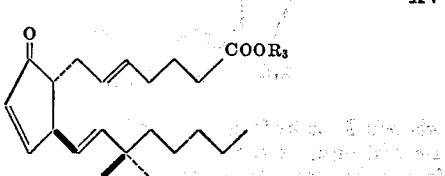  XVI

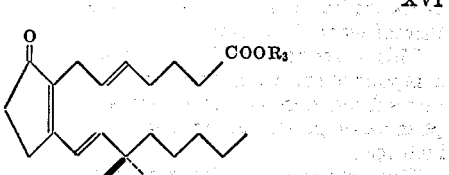  XVII

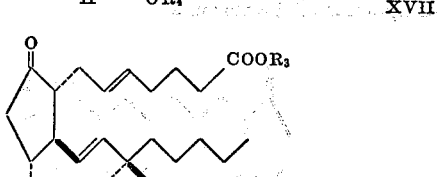  XVIII

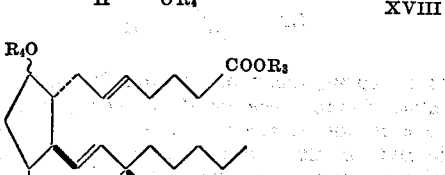  XIX

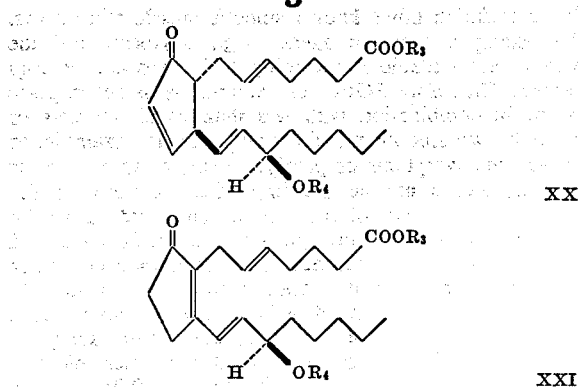

XX

XXI

In Formulas XIV to XXI, $R_3$ is hydrogen or alkyl of one to 8 carbon atoms, inclusive, and $R_4$ is hydrogen, formyl, or alkanoyl of 2 to 8 carbon atoms, inclusive. In Formulas XIV, XV, XVIII, and XIX, all $R_4$'s are the same, i.e. all are hydrogen or all are formyl or alkanoyl. In Formulas XV and XIX, ~ indicates attachment of hydroxy to the cyclopentane ring in alpha or beta configuration.

In Formulas XIV to XXI and in the formulas recited hereinafter in the specification and claims, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring.

The side-chain hydroxy at C–15 in Formulas XIV to XVII is in S (alpha) configuration. That configuration is shown by attachment of said side-chain hydroxy to C–15 with a dotted line and hydrogen with a heavy solid line. The alternative configuration for the side-chain hydroxy at C–15 shown in Formulas XVIII to XXI is known as R or epi (beta) and is shown when necessary by attachment of said side-chain hydroxy to C–15 with a heavy solid line and hydrogen with a dotted line, thus

The prostaglandin corresponding to 5,6-trans-PGE$_2$ (Formula XIV wherein $R_2$ and $R_3$ are hydrogen) but with the R or epi configuration at C–15 will be designated 5,6-trans-15$\beta$-PGE$_2$.

These conventions regarding formulas, names, and symbols for derivatives of prostanoic acid apply to the formulas, names, and symbols given hereinafter in the specification and claims. When reference is made hereinafter to the compounds of Formulas XIV to XVII, by the symbols 5,6-trans-PGE$_2$, -PGF$_{2\alpha}$, -PGF$_{2\beta}$, -PGA$_2$, or -PGB$_2$, or to the esters or alkanoates of any of those, 15(S) configuration will be intended and by established custom, "S" or alpha will not be mentioned in the name or symbol. For all of the other compounds recited hereinafter, the configuration at C–15 will be identified as "15$\beta$" whenever the 15(R) configuration is intended.

A significant characteristic of all of the known prostaglandins with a carbon-carbon double bond in the carboxyl-terminated side chain, i.e., the PG$_2$ compounds, is cis-configuration for that double bond. Prostaglandins obtained from animal tissue always have that double bond in cis-configuration. In striking contrast, each of the novel prostanoic acid derivatives of this invention has a trans-carbon-carbon double bond between C–5 and C–6. Since these novel Formula XIV-to-XXI prostanoic acid derivatives are related to the natural PG$_2$ compounds with regard to the numbers of double bonds, it is convenient to name them as 5,6-trans derivatives. An alternate method is to name them as trans-5,6-dehydro derivatives of the corresponding PG$_1$ compounds. Thus, when $R_3$ and $R_4$ in Formulas XIV, XV, XVI, and XVII are hydrogen, the compound defined by Formula XIV is named 5,6-trans-PGE$_2$, alternately trans-5,6-dehydro-PGE$_1$. The compounds defined by Formula XV are named 5,6-trans-PGF$_{2\alpha}$ and 5,6-trans-PGF$_{2\beta}$ according to the configuration of the hydroxy shown in Formula XV as attached to the ring with a wavy line. The compound defined by Formula XVI is named 5,6-trans-PGA-$_2$, and the compound defined by Formula XVII is named 5,6-trans-PGB$_2$. The 15$\beta$ epimers are named similarly, i.e. when $R_3$ and $R_4$ in Formulas XVIII, XIX, and XXI are hydrogen, the compounds are respectively 5,6-trans-15$\beta$-PGE$_2$, 5,6-trans-15$\beta$-PGF$_{2\alpha}$ (or -PGF$_{2\beta}$), 5,6-trans-15$\beta$-PGA$_2$, and 5,6-trans-15$\beta$-PGB$_2$.

As in the case of Formulas VIII to XIII, Formulas XIV to XVII are each intended to represent only optically active prostanoic acid derivatives with the same absolute configuration as PGE$_1$ obtained from mammalian tissues. The racemic or "dl" (optically inactive) compounds are then represented as a mixture of that formula and the mirror image thereof.

Formulas XVIII to XXI represent only optically active prostanoic acid derivatives with the 15$\beta$ (15-epi or 15(R)) configuration. Here also, the racemic compounds of these 15$\beta$ compounds are then represented as a mixture of that formula and the mirror image thereof.

PGE$_2$, PGF$_{2\alpha}$, PGF$_{2\beta}$, PGA$_2$, and PGB$_2$, and their esters and pharmacologically acceptable salts, are extremely potent in causing various biological responses. For that reason, these compounds are useful for pharmacological purposes. See, for example, Bergstrom et al., Pharmacol. Rev., 20, 1 (1968), and references cited therein. A few of those biological responses are systemic arterial blood pressure lowering in the case of the PGE$_2$ and PGE$_{2\beta}$ compounds as measured, for example, in anesthetized (pentobarbital sodium) pentolinium-treated rats with indwelling aortic and right heart cannulas; pressor activity, similarly measured, for the PGF$_{2\alpha}$ compounds; stimulation of smooth muscle as shown, for example, by tests on strips of guinea pig ileum, rabbit duodenum, or gerbil colon; potentiation of other smooth muscle stimulants; antilipolytic activity as shown by antagonism of epinephrine-induced mobilization of free fatty acids or inhibition of the spontaneous release of glycerol from isolated rat fat pads; inhibition of gastric secretion in the case of the PGE$_2$ and PGA$_2$ compounds as shown in dogs with secretion stimulated by food or histamine infusion; activity on the central nervous system; controlling spasm and facilitating breathing in asthmatic conditions; decreasing blood platelet adhesiveness as shown by platelet-to-glass adhesiveness, and inhibition of blood platelet aggregation and thrombus formation induced by various physical stimuli, e.g., arterial injury, and various biochemical stimuli, e.g., ADP, ATP, serotonin, thrombin, and collagen; and in the case of the PGE$_2$ and PGB$_2$ compounds, stimulation of epidermal proliferation and keratinization as shown when applied in culture to embryonic chick and rat skin segments.

Because of these biological responses, these known prostaglandins are useful to study, prevent, control, or alleviate a wide variety of diseases and undesirable physiological conditions in birds and mammals, including humans, useful domestic animals, pets, and zoological specimens, and in laboratory animals, for example, mice, rats, rabbits, and monkeys.

For example, these compounds, and especially the PGE$_2$ compounds, are useful in mammals, including man, as nasal decongestants. For this purpose, the compounds are used in a dose range of about 10 $\mu$g. to about 10 mg. per ml. of a pharmacologically suitable liquid vehicle or as an aerosol spray, both for topical application.

The PGE, PGF$_\alpha$, and PGA compounds are useful in the treatment of asthma. For example, these compounds are useful as bronchodilators or as inhibitors of mediators, such as SRS-A, and histamine which are released from cells activated by an antigen-antibody complex. Thus, these compounds control spasm and facilitate breathing in conditions such as bronchial asthma, bronchitis, bronchiectasis, pneumonia and emphysema. For these purposes, these compounds are administered in a variety of dosage forms, e.g., orally in the form of tablets, capsules, or liquids; rectally in the form of suppositories; parenterally, subcutaneously, or intramuscularly, with intravenous administration being preferred in emergency situations; by inhalation in the form of aerosols or solutions for nebulizers; or by insufflation in the form of powder. Doses in the range of about 0.01 to 5 mg. per kg. of body weight are used 1 to 4 times a day, the exact dose depending on the age, weight, and condition of the patient and on the frequency and route of administration. For the above use these prostaglandins can be combined advantageously with other anti-asthmatic agents, such as sympathomimetics (isoproterenol, phenylephrine, ephedrine, etc.); xanthine derivatives (theophylline and aminophyllin); and corticosteroids (ACTH and predinisolone). Regarding use of these compounds see South African Pat. No. 681,055.

The $PGE_2$ and $PGA_2$ compounds are useful in mammals, including man and certain useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 0.1 μg. to about 500 μg. per kg. of body weight per minute, or in a total daily dose by injection or infusion in the range about 0.1 to about 20 mg. per kg. of body weight per day, the exact dose depending on the age, weight, and condition of the patient or animal, and on the frequency and route of administration.

The $PGE_2$, $PGF_{2\alpha}$, and $PGF_{2\beta}$ compounds are useful whenever it is desired to inhibit platelet aggregation, to reduce the adhesive character of platelets, and to remove or prevent the formation of thrombi in mammals, including man, rabbits, and rats. For example, these compounds are useful in the treatment and prevention of myocardial infarcts, to treat and prevent post-operative thrombosis, to promote patency of vascular grafts following surgery, and to treat conditions such as atherosclerosis, arteriosclerosis, blood clotting defects due to lipemia, and other clinical conditions in which the underlying etiology is associated with lipid imbalance or hyperlipidemia. For these purposes, these compounds are administered systemically, e.g., intravenously, subcutaneously, intramuscularly, and in the form of sterile implants for prolonged action. For rapid response, especially in emergency situations, the intravenous route of administration is preferred. Doses in the range about 0.004 to about 20 mg. per kg. of body weight per day are used, the exact dose depending on the age, weight, and condition of the patient or animal, and on the frequency and route of administration.

The $PGE_2$, $PGF_{2\alpha}$, and $PGF_{2\beta}$ compounds are especially useful as additives to blood, blood products, blood substitutes, and other fluids which are used in artificial extracorporeal circulation and perfusion of isolated body portions, e.g., limbs and organs, whether attached to the original body, detached and being preserved or prepared for transplant, or attached to a new body. During these circulations and perfusions, aggregated platelets tend to block the blood vessels and portions of the circulation apparatus. This blocking is avoided by the presence of these compounds. For this purpose, the compound is added gradually or in single or multiple portions to the circulating blood, to the blood of the donor animal, to the perfused body portion, attached or detached, to the recipient, or to two or all of those at a total steady state dose of about 0.001 to 10 mg. per liter of circulating fluid. It is especially useful to use these compounds in laboratory animals, e.g., cats, dogs, rabbits, monkeys, and rats for these purposes in order to develop new methods and techniques for organ and limb transplants.

The $PGE_2$ compounds are extremely potent in causing stimulation of smooth muscle, and are also highly active in potentiating other known smooth muscle stimulators, for example, oxytocic agents, e.g., oxytocin, and the various ergot alkaloids including derivatives and analogs thereof. Therefore $PGE_2$, for example, is useful in place of or in combination with less than usual amounts of these known smooth muscle stimulators, for example, to relieve the symptoms of paralytic ileus, or to control or prevent atonic uterine bleeding after abortion or delivery, to aid in expulsion of the placenta, and during the puerperium. For the latter purpose, the $PGE_2$ compound is administered by intravenous infusion immediately after abortion or delivery at a dose in the range about 0.01 to about 50 μg. per kg. of body weight per minute until the desired effect is obtained. Subsequent doses are given by intravenous, subcutaneous, or intramuscular injection or infusion during puerperium in the range 0.01 to 2 mg. per kg. of body weight per day, the exact dose depending on the age, weight, and condition of the patient or animal.

The $PGE_2$ and $PGF_{2\beta}$ compounds are useful as hypotensive agents to reduce blood pressure in mammals, including man. For this purpose, the compounds are administered by intravenous infusion at the rate about 0.01 to about 50 μg. per kg. of body weight per minute or in single or multiple doses of about 25 to 500 μg. per kg. of body weight total per day.

The $PGE_2$, $PGA_2$, and $PGF_{2\beta}$ compounds also increase the flow of blood in the mammalian kidney, thereby increasing volume and electrolyte content of the urine. Therefore, these compounds are useful in managing cases of renal disfunction, especially those involving blockage of the renal vascular bed. Illustratively, the compounds are useful to alleviate and correct cases of edema resulting, for example, from massive surface burns, and in the management of shock. For these purposes, the compounds are preferably first administered by intravenous injection at a dose in the range 10 to 1000 μg. per kg. of body weight or by intravenous infusion at a dose in the range 0.1 to 20 μg. per kg. of body weight per minute until the desired effect is obtained. Subsequent doses are given by intravenous, intramuscular, or subcutaneous injection or infusion in the range 0.05 to 2 mg. per kg. of body weight per day.

The $PGE_2$, $PGF_{2\alpha}$, and $PGF_{2\beta}$ compounds are useful in place of oxytocin to induce labor in pregnant female animals, including man, cows, sheep, and pigs, at or near term, or in pregnant animals with intrauterine death of the fetus from about 20 weeks to term. For this purpose, the compound is infused intravenously at a dose 0.01 to 50 μg. per kg. of body weight per minute until or near the termination of the second stage of labor, i.e., expulsion of the fetus. These compounds are especially useful when the female is one or more weeks post-mature and natural labor has not started, or 12 to 60 hours after the membranes have ruptured and natural labor has not yet started.

The $PGF_{2\alpha}$, $PGF_{2\beta}$, $PGE_2$, and $PGA_2$ compounds are useful for controlling the reproductive cycle in ovulating female mammals, including humans and animals such as monkeys, rats, rabbits, dogs, cattle, and the like. For that purpose, $PGF_{2\alpha}$, for example, is administered systemically at a dose level in the range 0.01 mg. to about 20 mg. per kg. of body weight of the female mammal, advantageously during a span of time starting approximately at the time of ovulation and ending approximately at the time of menses or just prior to menses. Additionally, expulsion of an embryo or a fetus is accomplished by similar administration of the compound during the first third of the normal mammalian gestation period.

As mentioned above, the $PGE_2$ compounds are potent antagonists of epinephrine-induced mobilization of free fatty acids. For this reason, this compound is useful in experimental medicine for both in vitro and in vivo studies in mammals, including man, rabbits, and rats, intended to lead to the understanding, prevention, symptom alleviation, and cure of diseases involving abnormal lipid mobilization and high free fatty acid levels, e.g., diabetes melitus, vascular diseases, and hyperthyroidism.

The $PGE_2$ and $PGB_2$ compounds promote and accelerate the growth of epidermal cells and keratin in animals, including humans, useful domestic animals, pets, zoological specimens, and laboratory animals. For that reason, these compounds are useful to promote and accelerate healing of skin which has been damaged, for example, by burns, wounds, and abrasions, and after surgery. These compounds are also useful to promote and accelerate adherence and growth of skin autografts, especially small, deep (Davis) grafts which are intended to cover skinless areas by subsequent outward growth rather than initially, and to retard rejection of homografts.

For these purposes, these compounds are preferably administered topically at or near the site where cell growth and keratin formation is desired, advantageously as an aerosol liquid or micronized powder spray, as an isotonic aqueous solution in the case of wet dressings, or as a lotion, cream, or ointment in combination with usual pharmaceutically acceptable diluents. In some instances, for example, when there is substantial fluid loss as in the case of extensive burns or skin loss due to other causes, systemic administration is advantageous, for example, by intravenous injection for infusion, separate or in combination with the usual infusions of blood, plasma, or substitutes thereof. Alternative routes of administration are subcutaneous or intramuscular near the site, oral, sublingual, buccal, rectal, or vaginal. The exact dose depends on such factors as the route of administration, and the age, weight, and condition of the subject. To illustrate, a wet dressing for topical application to second and/or third degree burns of skin area 5 to 25 square centimeters would advantageously involve use of an isotonic aqueous solution containing 1 to 500 µg./ml. of the $PGB_2$ compound or several times that concentration of the $PGE_2$ compound. Especially for topical use, these prostaglandins are useful in combination with antibiotics, for example, gentamycin, neomycin, polymyxin B, bacitracin, spectinomycin, and oxytetracycline, with other antibacterials, for example, mafenide hydrochloride, sulfadiazine, furazolium chloride, and nitrofurazone, and with corticoid steroids, for example, hydrocortisone, prednisolone, methylprednisolone, and fluprednisolone, each of those being used in the combination at the usual concentration suitable for its use alone.

The novel 5,6-trans-$PG_2$ compounds encompassed by Formulas XIV to XVII, and their 15β epimers of Formulas XVIII to XXI each cause the same biological responses described above for the corresponding known prostaglandins. Each of these new compounds is accordingly useful for the above-described pharmacological purposes, and is used for those purposes as described above.

The known $PGE_2$, $PGF_{2\alpha}$, $PGF_{2\beta}$, $PGA_2$, and $PGB_2$ compounds are all potent in causing multiple biological responses even at low doses. For example, $PGE_2$ is extremely potent in causing vasodepression and smooth muscle stimulation, and also are potent as antilipolytic agents. Moreover, for many applications, these known prostaglandins have an inconveniently short duration of biological activity. In striking contrast, the novel Formula XIV-to-XXI compounds are substantially more specific with regard to potency in causing prostaglandin-like biological responses, and have a substantially longer duration of biological activity. Therefore, each of these novel prostaglandin analogs is surprisingly an unexpectedly more useful than one of the corresponding above-mentioned known prostaglandins for at least one of the pharmacological purposes indicated above for the latter, because it has a different and narrower spectrum of biological activity than the known prostaglandins, and therefore is more specific in its activity and causes smaller and fewer undesired side effects than when the known prostaglandin is used for the same purpose. Moreover, because of its prolonged activity, fewer and smaller doses of the novel prostaglandin analog can frequently be used to attain the desired result.

The novel Formula XIV-to-XXI compounds are used as described above in free acid form, in alkyl ester form, in formate or alkanoate form, or in pharmacologically acceptable salt form. When the ester form is used, any alkyl ester can be used wherein the alkyl moiety contains one to 8 carbon atoms, inclusive, i.e., methyl, ethyl, propyl, butyl, pentyl, hexyl, heptyl, octyl, and isomeric forms thereof. However, it is preferred that the ester be alkyl of one to four carbon atoms, inclusive. Of those alkyl, methyl and ethyl are especially preferred for optimum absorption of the compound by the body or experimental animals system.

When the formate or alkanoate form is used, all of the hydroxy moieties are transfermed to formate or alkanoate moieties, so that no free hydroxyls remain on the compound. For this purpose, hydroxy hydrogen is replaced by formyl or alkanoyl of 2 to 8 carbon atoms, e.g. —OH is transformed to —$OCOCH_3$. Examples of alkanoyl moieties are acetyl, propionyl, butyryl, valeryl, hexanoyl, heptanoyl, octanoyl, and branched chain alkanoyl isomers of those moieties. Especially preferred among these alkanoates for the above described purposes are the acetoxy compounds. These formates and alkanoates are used as free acids, as esters, and in salt form as described herein.

Pharmacologically acceptable salts of these prostaglandin analogs useful for the purposes described above are those with pharmacologically acceptable metal cations, ammonium, amine cations, or quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl - 1,3 - propanediol, 2-amino-2-methyl-1-propanol, tris(hydroxymethyl)aminomethane, N-phenylethanolamine, N-(p-tert-amylphenyl)diethanolamine, glactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethylammonium, and the like.

As discussed above, the prostaglandin analogs are administered in various ways for various purposes; e.g., intravenously, intramuscularly, subcutaneously, orally, intravaginally, rectally, buccally, sublingually, topically, and in the form of sterile implants for prolonged action.

For intravenous injection or infusion, sterile aqueous isotonic solutions are preferred. For that purpose, it is preferred because of increased water solubility to use the free acid form or the pharmacologically acceptable salt form. For subcutaneous or intramuscular injection, sterile solutions or suspensions of the acid, salt, or ester form in aqueous or non-aqueous media are used. Tablets, capsules, and liquid preparations such as syrups, elixirs, and simple solutions, with the usual pharmaceutical carriers are used for oral or sublingual administration. For rectal or vaginal administration, suppositories, tampons, ring devices, and preparations adapted to generate sprays or foams or to be used for lavage, all prepared as known in the art, are used. For tissue implants, a sterile tablet or silicone rubber capsule or other object containing or impregnated with the substance is used.

The novel 5,6-trans-$PG_2$ compounds of Formulas XIV to XVII, wherein $R_3$ is as defined above and $R_4$ is hydrogen, are prepared by the reactions defined in Chart A.

In Chart A, the initial starting materials are $PGE_2$ and its alkyl esters (Formula XXII), and $PGF_{2\alpha}$ and $PGF_{2\beta}$ and their alkyl esters (Formula XXIII). Those acids and alkyl esters, their 15β-epimers, and racemic mixtures are known in the art or are prepared by methods known in the art. See, for example, British Specification 1,040,544; E. J. Corey et al., J. Am. Chem. Soc., 91, 5675 (1969) and 92, 397 (1970); and W. P. Schneider, Chem. Commun., Mar. 19, 1969, pp. 304–305.

The transformation of $PGE_2$ and its esters (XXII) to 5,6-trans-$PGE_2$ and its esters (XXIV), transformation of $PGF_{2\alpha}$ and its esters (XXIII) to 5,6-trans-$PGF_{2\alpha}$ and its esters (XXV), and the transformation of $PGF_{2\beta}$ and its esters (XXIII) to 5,6-trans-$PGF_{2\beta}$ and its esters (XXV) is effected by exposing a solution containing the Formula-XXII or -XXIII reactant and a diaryl sulfide or diaryl disulfide to ultraviolet radiation in the range 3000 to 5000 A.

For this isomerization any diaryl sulfide or diaryl disulfide which is dissociated to aranethiyl radicals by this range of ultraviolet radiation and which does not contain functional groups which will react with the Formula-XXII or -XXIII starting material can be used. A suitable diaryl sulfide is diphenyl sulfide. A suitable diaryl disulfide is diphenyl disulfide.

The amount of diaryl sulfide or diaryl disulfide is not critical as long as the amount is at least enough to generate sufficient aranethiyl radicals to effect the desired isomerization. An amount about equal in weight to the weight of the Formula-XXII or -XXIII reactant is usually suitable.

Any liquid organic solvent or mixture of solvents which gives a homogeneous reaction mixture and which does not react with the Formula-XXII or -XXIII starting material or the aranethiyl radicals can be used. A mixture of benzene and methanol is a suitable reaction solvent.

The exposure to ultraviolet radiation is advantageously carried out in the range 20° to 30° C., although higher or lower reaction temperatures are operable. Exposure is continued until repeated thin layer chromatography (TLC) shows no increase in the amount of the desired 5,6-trans-$PGE_2$ product. Usually 24 hours at 25° C. is a suitable irradiation time. The TLC is done on silica gel

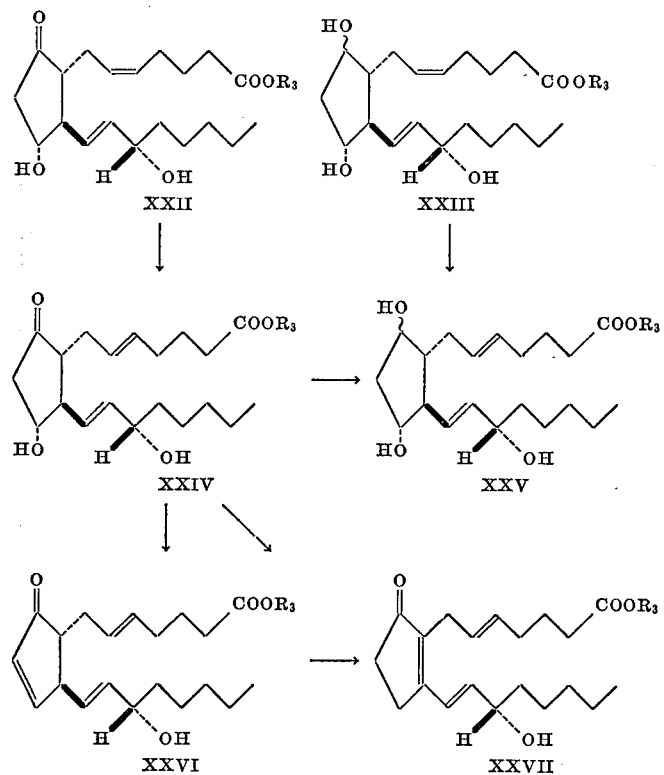

CHART A plates impregnated with silver nitrate, using chloroform: acetic acid:methanol (80:10:10) as the solvent system, and visualization by spraying with 50% aqueous sulfuric acid and then charring.

The desired product is separated from the other reaction mixture components by methods known in the art, for example, evaporation of the reaction mixture, and chromatography of the residue.

An alternate method for producing 5,6-trans-$PGF_{2\alpha}$, 5,6-trans-$PGF_{2\beta}$, and their alkyl esters (XXV) comprises ring carbonyl reduction of the corresponding Formula-XXIV 5,6-trans-$PGE_2$ acid or alkyl ester. Mixtures of the 5,6-trans-$PGF_{2\alpha}$ and 5,6-trans-$PGF_{2\beta}$ compounds are thereby obtained.

These ring carbonyl reductions are carried out by methods known in the art for ring carbonyl reductions of known prostanoic acid derivatives. See, for example, Bergstrom et al., Arkiv Kemi, 19, 563 (1963), and Acta Chem. Scand., 16, 969 (1962), and British Specification No. 1,097,533. Any reducing agent is used which does not react with carbon-carbon double bonds or ester groups.

Preferred reagents are lithium (tri-tert-butoxy) aluminum hydride, the metal borohydrides, especially sodium, potassium and zinc borohydrides, and the metal trialkoxy borohydrides, e.g., sodium trimethoxyborohydride. The mixtures of alpha and beta hydroxy reduction products are separated into the individual alpha and beta isomers by methods known in the art for the separation of analogous pairs of known isomeric prostanoic acid derivatives. See, for example, Bergstrom et al., cited above, Granstrom et al., J. Biol. Chem., 240, 457 (1965), and Green et al., J. Lipid Research, 5, 117 (1964). Especially preferred as separation methods are partition chromatographic procedures, both normal and reversed phase, preparative thin layer chromatography, and countercurrent distribution procedures.

Referring again to Chart A, 5,6-trans-PGA$_2$ and its alkyl esters (XXVI) are produced by acidic dehydration of 5,6-trans-PGE$_2$ and its alkyl esters (XXIV).

These acidic dehydrations are carried out by methods known in the art for acidic dehydrations of known prostanoic acid derivatives. See, for example, Pike et al., Proc. Nobel Symposium II, Stockholm (1966), Interscience Publishers, New York, p. 162 (1967), and British Specification 1,097,533. Alkanoic acids of 2 to 6 carbon atoms, inclusive, especially acetic acid, are preferred acids for this acidic dehydration. Dilute aqueous solutions of mineral acids, e.g., hydrochloric acid, especially in the presence of a solubilizing diluent, e.g., tetrahydrofuran, are also useful as reagents for this acidic dehydration, although these reagents may cause partial hydrolysis of an ester reactant.

Referring again to Chart A, 5,6-trans-PGB$_2$ and its alkyl ester (XXVII) are produced either by a basic dehydration of the corresponding 5,6-trans-PGE$_2$ acid or alkyl ester (XXIV) or by contacting the corresponding 5,6-trans-PGA$_2$ acid or alkyl ester (XXVI) with a base.

These basic dehydrations and double bond migrations are carried out by methods known in the art for similar reactions of known prostanoic acid derivatives. See, for example, Bergstrom et al., J. Biol. Chem., 238, 3555 (1963). The base is any whose aqueous solution has pH greater than 10. Preferred bases are the alkali metal hydroxides. A mixture of water and sufficient of a water-miscible alkanol to give a homogeneous reaction mixture is suitable as a reaction medium. The PGE type or PGA type compound is maintained in such a reaction medium until no further PGB type compound is formed, as shown by the characteristic ultraviolet light absorption near 278 m$\mu$ for the PGB type compound.

The transformations of Chart A to produce the 5,6-trans-PG$_2$ compounds of Formulas XIV to XVII are also utilized in producing the corresponding 15$\beta$ epimers of Formulas XVIII to XXI. For this purpose, the Formula-XXII and -XXIII initial starting materials are replaced by the corresponding 15$\beta$-PGE$_2$ and 15$\beta$-PGF$_{2\alpha}$ (or -PGF$_{2\beta}$) compounds. There are then obtained the corresponding 5,6-trans-15$\beta$-PGE$_2$, 5,6-trans-15$\beta$-PGF$_{2\alpha}$ (or -PGF$_{2\beta}$), 5,6-trans-15$\beta$-PGA$_2$, and 5,6-trans-15$\beta$-PGB$_2$ compounds, either as the free acids or esters.

Likewise, the racemic 5,6-trans-PG$_2$ compounds and their 15$\beta$-epimers are produced by the same transformations shown in Chart A, replacing the PG$_2$ compounds with the appropriate racemic PG$_2$ or racemic 15$\beta$-PG$_2$ starting materials.

When a Formula XIV-to-XXI 5,6-trans-PG$_2$ acid or 5,6-trans-15$\beta$-PG$_2$ acid (R$_2$ is hydrogen), or the corresponding racemic compound, has been prepared, and an alkyl ester is desired, esterification is advantageously accomplished by interaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., Vol. 8, pp. 389–394 (1954).

An alternative method for esterification of the carboxyl moiety of the PGF-type or PGE-type compounds comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stochiometric amount of silver nitrate.

The final Formula XIV-to-XXI acids or esters prepared by the processes of this invention are transformed to alkanoates by interaction of the Formula XIV-to-XXI hydroxy compound with a carboxyacylating agent, preferably the anhydride of a lower alkanoic acid, i.e., an alkanoic acid of 2 to 8 carbon atoms, inclusive. For example, use of acetic anhydride gives the corresponding diacetate. Similar use of propionic anhydride, isobutyric anhydride, and hexanoic acid anhydride gives the corresponding carboxyacylates. In the same manner, the racemic form of the Formula XIV-to-XXI compounds yields the corresponding racemic products.

The carboxyacylation is advantageously carried out by mixing the hydroxy compound and the acid anhydride, preferably in the presence of a tertiary amine such as pyridine or triethylamine. A substantial excess of the anhydride is used, preferably about 10 to about 10,000 moles of anhydride per mole of the hydroxy compound reactant. The excess anhydride serves as a reaction diluent and solvent. An inert organic diluent, for example, dioxane, can also be added. It is preferred to use enough of the tertiary amine to neutralize the carboxylic acid produced by the reaction, as well as any free carboxyl groups present in the hydroxy compound reactant.

The carboxyacylation reaction is preferably carried out in the range about 0° to about 100° C. The necessary reaction time will depend on such factors as the reaction temperature, and the nature of the anhydride and tertiary amine reactants. With acetic anhydride, pyridine, and a 25° C. reaction temperature, a 12 to 24-hour reaction time is used.

The carboxylated produce is isolated from the reaction mixture by conventional methods. For example, the excess anhydried is decomposed with water, and the resulting mixture acidified and then extracted with a solvent such as diethyl ether. The desired carboxyacylate is recovered from the diethyl ether extract by evaporation. The carboxyacylate is then purified by conventional methods.

By this procedure, the Formula-XIV and -XVIII PGE-type hydroxy compounds are transformed to dialkanoates, the Formula-XV and -XIX PGF-type hydroxy compounds are transformed to trialkanoates, and the Formula XVI, XVII, XX, and XXI PGA-type and PGB-type hydroxy compounds are transformed to monoalkanoates.

When a formate of a Formula XIV-to-XXI acid or ester is desired for one of the above-described pharmacological purposes, i.e. when R$_4$ in Formulas XIV to XXI is formyl, that is prepared by formylation of the corresponding Formula XIV-to-XXI hydroxy compound. This formylation is carried out by procedures known in the art, for example by reaction of the hydroxy compound with the mixed anhydride of acetic and formic acids or with formylimidazole. See, for example, Fiester et al., Reagents for Organic Synthesis, John Wiley & Sons, Inc., pp. 4 and 407 (1967) and references cited therein.

The novel Formula XIV-to-XXI acids ($R_3$ and $R_4$ are hydrogen) or their racemic forms are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the prostanoic acid derivative. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the correspondng quaternary ammonium hydroxide in water solution, followed by evaporation of the water.

Since our invention of the novel Formula-I and -IV compounds and their 15$\beta$-epimers, i.e. 5,6-trans-$PGE_2$, 5,6-trans-$PGE_2$ methyl ester, 5,6-trans-$PGE_2$ diacetate, 5,6-trans-$PGE_2$ diacetate methyl ester, 5,6-trans-$PGA_2$, 5,6-trans-$PGA_2$ methyl ester, 5,6-trans-$PGA_2$ acetate and 5,6-trans-$PGA_2$ acetate methyl ester, and their 15$\beta$-epimers, it has been discovered that certain other prostaglandins, i.e., the prostaglandins known as $PGA_2$, $PGA_2$ methyl ester, and $PGA_2$ acetate, methyl ester are obtained by extraction of colonies or colony pieces of the marine invertebrate Plexaura homomalla (Esper), 1791, forma S, and separating those compounds from the resulting extract. Also, certain corresponding 15-epi compounds, namely 15$\beta$-$PGA_2$ and 15$\beta$-$PGA_2$ acetate, methyl ester, are known in the art (see, for example, Weinheimer et al., Tetrahedron Letters, No. 59, 5185 (1969)), and are obtained by extraction of colonies of Plexaura homomalla (Esper), 1972, forma R.

These Plexaura homomalla forms are members of the subclass Octocorallia, order Gorgonacea, suborder Holaxonia, family Plexauridae, genus Plexaura. See, for example, Bayer, "The Shallow-Water Octocorallia of the West Indian Region," Martinus Nijoff, The Hague (1961). Colonies of these Plexaura homomalla forms are abundant on the ocean reefs in the zone from the low-tide line to about 25 fathoms in the tropical and subtropical regions of the western part of the Atlantic Ocean, from Bermuda to the reefs of Brazil, including the eastern shore reefs of Florida, the Caribbean island and mainland reefs, and the Gulf of Mexico island and mainland reefs. These colonies are bush-like or small tree-like in habit, and are readily identified for collection as Plexaura homomalla (Esper), 1792, by those of ordinary skill in this art. Forms R and S are distinguished by the method described in Preparation 1, below.

Although $PGA_2$, $PGA_2$ methyl ester, and $PGA_2$ acetate, methyl ester, or one or two of those appear to be the predominate prostaglandin-like components of Plexaura homomalla, forma S, together with small amounts of $PGE_2$ methyl ester, it has now been found that small amounts of the 5,6-trans compounds, viz. 5,6-trans-$PGA_2$, 5,6-trans-$PGA_2$ methyl ester, 5,6-trans-$PGA_2$ acetate, 5,6-trans-$PGA_2$ acetate methyl ester, 5,6-trans-$PGE_2$, and 5,6-trans-$PGE_2$ methyl ester are also obtained from this same organism. This is shown, for example, by the experiments described in Preparations 2–4 below and in the paragraphs following those preparations. It has not yet been conclusively shown that 5,6-trans-$PGE_2$ diacetate or 5,6-trans-$PGE_2$ diacetate methyl ester are present or obtainable from this same member or another member of the Octocorallia subclass, but since $PGA_2$ acetate methyl ester has been obtained from this source, it seems possible that 5,6-trans-$PGE_2$ diacetate and 5,6-trans-$PGE_2$ diacetate methyl ester will also be present or obtainable from the same source.

When these 5,6-trans-$PGA_2$ and 5,6-trans-$PGE_2$ compounds are obtained from a member of the Octocorallia subclass, e.g., Plexaura homomalla (Esper), 1792 forma S, and are intended for one or more of the above-described pharmacological uses, these compounds must, of course, be obtained essentially free of the other components of colonies of the subclass Octocorallia. By the term "essentially free" here is meant a degree of freedom from these other components except, of course, water, such that these 5,6-trans-$PGA_2$ and 5,6-trans-$PGE_2$ compounds are suitable for their intended pharmacological uses, including parenteral administration to humans. When these compounds are essentially free of these other components of the subclass Octocorallia, they are considered to be essentially pure and usable for all of the above-described pharmacological uses.

In obtaining the above essentially pure 5,6-trans-$PGE_2$ compounds, and, if possible, essentially pure 5,6-trans-$PGE_2$ diacetate and 5,6-trans-$PGE_2$ diacetate methyl ester, from colonies of the subclass Octocorallia, it is important that these compounds be essentially free, as that term is defined above, from other prostaglandin-like compounds. For example, the 5,6-trans-$PGA_2$-type compounds which are likely to be present in the same colonies have different spectra of biological activity and, if present as contaminants, are likely to interfere with the above-described pharmacological uses of the 5,6-trans-$PGE_2$ methyl ester and 5,6-trans-$PGE_2$ diacetate methyl ester. This degree of purity is readily obtained, especially in the case of 5,6-trans-$PGA_2$-type contaminants. There are substantial differences in polarity among the various prostaglandins. For example, 5,6-trans-PGA-type prostaglandins are less polar than 5,6-trans-PGE-type prostaglandins. Advantage is easily taken of these differences by using silica gel chromatography, either preparative thin layer or column.

Furthermore, a procedure for separating the various $PGA_2$-type or $PGE_2$-type compounds which may be present in a member of the subclass Octocorallia from the desired 5,6-trans-$PGA_2$-type or 5,6-trans-$PGE_2$-type compounds using a silver resinate column is described in Preparation 4, below. The processes for obtaining $PGA_2$-type compounds and $PGE_2$ methyl ester from Plexaura homomalla (Esper), 1792, forma S described in Preparations 2 and 3 below, are not part of our invention. Rather, our invention is the novel and useful compounds of Formulas I–VI and XIV to XXI regardless of how those are prepared.

Although 15$\beta$-$PGA_2$, 15$\beta$-$PGA_2$ methyl ester, and 15$\beta$-$PGA_2$ acetate, methyl ester, appear to be the predominate prostaglandin-like components of Plexaura homomalla, forma R, it has now been found that small amounts of the 5,6-trans-15β compounds, viz. 5,6-trans-15β-PGA$_2$, 5,6-trans-15β-PGA$_2$ methyl ester, 5,6-trans-15β-PGA$_2$ acetate, 5,6-trans-15β-PGA$_2$ acetate methyl ester, 5,6-trans-15β-PGE$_2$, and 5,6-trans-15β-PGE$_2$ methyl ester are also obtained from this same organism. This is shown, for example, by the experiments described in Preparations 3–4 below. As for the corresponding 5,6-trans-15α compounds, it has not yet been conclusively shown that 5,6-trans-15β-PGE$_2$ diacetate or 5,6-trans-15β-PGE$_2$ diacetate methyl ester are present or obtainable.

When these 5,6 trans-15β-PGA$_2$ and 5,6-trans-15β-PGE$_2$ compounds are obtained from a member of the Octocorallia subclass, e.g. *Plexaura homomalla* (Esper), 1792, forma R, and are intended for one or more of the above-described pharmacological uses, these compounds must, of course, be obtained essentially free of the other components of colonies of the subclass Octocorallia. By the term "essentially free" here is meant a degree of freedom from these other components except, of course, water, such that these 5,6-trans-15β-PGA$_2$ and 5,6-trans-15β-PGE$_2$ compounds are suitable for their intended pharmacological uses, including parenteral administration to humans. When these compounds are essentially free of these other components of the subclass Octocorallia, they are considered to be essentially pure and usable for all of the above-described pharmacological uses.

In obtaining these 5,6-trans-15β-PGE$_2$ compounds essentially free of 5,6-trans-15β-PGA$_2$ compounds, use is made of silica gel chromatography. Also, procedures for separating 15β-PGA$_2$-type or 15β-PGE$_2$-type compounds from the desired 5,6-trans-15β-PGA$_2$-type or 5,6-trans-15β-PGE$_2$-type compounds are available, as set forth below in the Preparations.

The invention can be more fully understood by the following examples.

All temperatures are in degrees centigrade.

Infrared absorption spectra are recorded on a Perkin-Elmer Model 421 infrared spectrophotometer. Except when specified otherwise, undiluted (neat) samples are used.

Ultraviolet spectra are recorded on a Cary Model 15 spectrophotometer.

Mass spectra are recorded on an Atlas CH–4 mass spectrometer with a TO–4 source (ionization voltage 70 ev.).

The collection of chromatographic eluate fractions starts when the eluant front reaches the bottom of the column.

"Brine," herein, refers to an aqueous saturated sodium chloride solution.

The A–IX solvent system used in thin layer chromatography (TLC) is made up from ethyl acetate-acetic acid-2,2,4-trimethylpentane-water (90:20:50:100) according to M. Hamberg and B. Samuelsson, J. Biol. Chem., 241, 257 (1966).

PREPARATION 1

To distinguish *Plexaura homomalla* (Esper), 1792 forma R from *Plexaura homomalla* (Esper), 1792 forma S a TLC method is used. A specimen approximately 2 cm. in length is harvested and placed in a small vial with a small amount of water if necessary to insure it is wet; and kept closed for 6–24 hrs. About one ml. of methanol is then added and the sample is either shaken for 2 hrs. at about 25° C. or is stored for 16–24 hrs. at about 10° C. A sample of the liquid (10–21λ) is spotted on a TLC plate. It is preferred to use a fluorescent-treated silica gel plate, e.g. Uniplate Silica Gel GF (Analtech, Inc., Newark, Del.). As reference standards, spots of PGA$_2$ and 15β-PGA$_2$ are also applied. The plate is developed in the A–IX system (Hamberg and Samuelsson, J. Biol. Chem., 241, 257 (1965)). The spots are finally visualized with vanillin-phosphoric acid spray (McAleer, Arch. Biochem. E. Biophys., 66, 120 (1957)). Comparison of the unknown with the two reference spots is then made and the identity of the coral established (forma S corresponding to PGA$_2$, forma R to 15β-PGA$_2$).

PREPARATION 2

PGA$_2$ from *Plexaura homomalla* (Esper), 1792, forma S

Colonies of *Plexaura homomalla* (Esper), 1792, forma S, collected from reefs off the north shore of Jamaica, are frozen by contact with solid carbon dioxide within one hour after removal from the reef waters. The frozen colonies are maintained in insulated boxes containing solid carbon dioxide (temperature below about −20° C.) until ready for thawing. Then, the frozen colonies (700 g.) are ground to a small particle size (Waring Blender) and mixed with 1500 ml. of water. The mixture is maintained about 20 hours at 25° C. with stirring. Then, the mixture is filtered through a pad of diatomaceous earth, and the filtrate is acidified with concentrated hydrochloric acid to pH about 2–3. The acidified filtrate is extracted four times with ethyl acetate. The extracts are combined, filtered, washed with brine, dried with anhydrous sodium sulfate, and evaporated under reduced pressure to give 11 g. of oily residue.

The solid residue on the diatomaceous earth filter pad is stirred 2 hours in methanol (enough to cover said residue) at 25° C. The mixture is then filtered, and the filtrate is evaporated to give 14 g. of oily residue.

The two oily residues are combined and chromatographed on 1500 g. of acid-washed silica gel, eluting successively with 8 l. of a 25 to 65% gradient of ethyl acetate in Skellysolve B, 8 l. of a 65 to 100% gradient of ethyl acetate in Skelleysolve B, and 5 l. of a 2% methanol in ethyl acetate, collecting 500-ml. fractions. (Skellysolve B is a mixture of isomeric hexanes.) Fractions 8–12 are combined and evaporated to give a small amount of PGA$_2$ containing a trace of PGA$_2$ methyl ester. Fractions 15–18 are combined and evaporated to give 9.54 g. of PGA$_2$.

PREPARATION 3

PGA$_2$ compounds from *Plexaura homomalla* (Esper), 1792, forma S

Colonies of *Plexaura homomalla* (Esper), 1792, forma S, collected from reefs off the north shore of Jamaica, are chopped into chunks several inches long. The chunks are frozen by contact with solid carbon dioxide within one hour after removal from the reef waters. The frozen colony pieces are maintained in insulated boxes containing solid carbon dioxide (temperature below about −20° C.) until the time for extraction. Then, the frozen colony pieces are ground to a small particle size (Mitts and Merrill hogger; average largest dimension about 5 mm.). The particles (1500 g.) are then stirred at high speed with 5 gallons of dichloromethane for 20 minutes at about 25° C. external temperature. The mixture of dichloromethane and particles is then filtered through a pad of diatomaceous earth, and the filtrate is evaporated to about a 2-liter volume at 30° C. under reduced pressure. The liquid which remains is washed with water, dried with sodium sulfate, and evaporated at 30° C. under reduced pressure.

The oily residue (60 g.) is chromatographed on 3 kg. of silica gel wet packed in Skellysolve B (a mixture of isomeric hexanes), eluting successively with a gradient of 4 l. of Skellysolve B and 4 l. of 20% ethyl acetate in Skellysolve B, 27 l. of 20%, 18 l. of 50%, and 8 l. of 75% ethyl acetate in Skellysolve B, collecting 600-ml. fractions. Fractions 39–60 are combined and evaporated to give PGA$_2$ acetate methyl ester. Fractions 74–76 are combined and evaporated to give 1.03 g. of PGA$_2$ methyl ester. Between fractions 60 and 74 those fractions shown by TLC to contain PGA$_2$ acetate are combined and evaporated to yield that compound. Likewise, between fractions 60 and 74, those fractions shown by TLC to contain PGE$_2$ diacetate methyl ester are combined and evaporated to yield that compound. Still later fractions, after fractions 74–76, shown by TLC to contain $PGE_2$ methyl ester are combined and evaporated to yield that compound.

Detection of the respective compounds by TLC is done by methods known in the art, e.g. by spotting the extract fractions on a TLC silica gel plate alongside spots of the authentic compounds, developing the plate with the A–IX system, and observing which spots of the extract fractions correspond exactly to the spots of the authentic compounds.

Following the procedures of Preparations 2 and 3, but replacing the colonies of Plexaura homomalla (Esper), 1792, forma S with colonies of Plexaura homomalla (Esper), 1792, forma R collected from the reefs off the southeast shore of Florida near Miami, there are obtained the corresponding $15\beta$ compounds, viz $15\beta$-$PGA_2$, $15\beta$-$PGA_2$ acetate methyl ester, $15\beta$-$PGA_2$ methyl ester, $15\beta$-$PGA_2$ acetate, $15\beta$-$PGE_2$ diacetate methyl ester, and $15\beta$-$PGE_2$ methyl ester.

Each of the $PGA_2$-type, $PGE_2$-type, $15\beta$-$PGA_2$-type, and $15\beta$-$PGE_2$-type compounds obtained by the procedures of Preparations 2 and 3 and the paragraphs following Preparation 3 contains the corresponding 5,6-trans compound, e.g. the $PGA_2$ fraction of Preparation 2 contains 5,6-trans-$PGA_2$. Separation of the 5,6-trans compound from the prostaglandin is done on a silver resinate column as exemplified in Preparation 4.

PREPARATION 4

5,6-trans-$PGA_2$

Separation of 5,6-trans-$PGA_2$ from $PGA_2$ is done on a chromatographic column using a silver-saturated ion-exchange resin. For background on such a column see E. A. Emken et al., J. Am. Oil Chemists' Soc., 41, 388 (1964). Preferably a macroreticular ion exchange resin is used, e.g. a sulfonated styrene-divinylbenzene copolymer having surface area of 40–50 sq. m./g., 30–40% porosity, and total exchange capacity of 4.5–5.0 meq. per gram of dry resin, for example Amberlyst 15, available from Rohm and Haas Co., Philadelphia, Pa. The acid-form resin is packed in a column, washed with warm water, and converted to the silver form by passing 10% silver nitrate solution through the column until the effluent shows a pH of 3.5–4.0. The column is then washed with water to remove ionic silver, and finally with denatured ethanol (Type 3A). An ethanolic solution of $PGA_2$ and 5,6-trans-$PGA_2$ is charged to the column. Elution with 3A alcohol then yields fractions which are combined according to their content of 5,6-trans-$PGA_2$ (faster-eluting) or $PGA_2$. Assay for 5,6-trans-$PGA_2$ or $PGA_2$ in the eluate is conveniently done by TLC using silver nitrate-treated silica gel plates (e.g. Analtech Uniplates dipped in saturated ethanolic silver nitrate and dried) and developing with the A–IX system (upper phase from 2,2,4-trimethylpentane:ethyl acetate:acetic acid:water in proportions 50:90:20:100). $R_f$ of $PGA_2$ is 0.45; $R_f$ of 5,6-trans-$PGA_2$ is 0.50. Combined fractions containing 5,6-trans-$PGA_2$ are concentrated, partioned between dichloromethane and a little water, dried over sodium sulfate, and concentrated under reduced pressure to yield the title compound.

Following the procedures of Preparation 4, each of the $PGA_2$-type and $PGE_2$-type fractions of Preparations 2 and 3 is subjected to a silver resinate column to yield the corresponding 5,6-trans compound, for example 5,6-trans-$PGA_2$ methyl ester, 5,6-trans-$PGA_2$ acetate, 5,6-trans-$PGA_2$ acetate methyl ester, 5,6-trans-$PGE_2$, 5,6-trans-$PGE_2$ methyl ester.

Also following the procedures of Preparation 4, each of the $15\beta$-$PGA_2$-type and $15\beta$-$PGE_2$-type fractions obtained following the procedures of Preparation 2 and 3 yields the corresponding 5,6-trans-$15\beta$ compound.

EXAMPLE 1

5,6-trans-$PGE_2$

A solution of $PGE_2$ (0.50 g.) and diphenyl sulfide (0.50 g.) in a mixture of 100 ml. of benzene and 10 ml. of methanol is placed in a quartz tube, purged of oxygen by bubbling nitrogen gas slowly through the solution, and then irradiated with 3500 A. ultraviolet light (Rayonet photo-chemical reactor) at 25° C. for 24 hours. The resulting solution is then evaporated under reduced pressure. The residue is chromatographed on 20 g. of acid-washed silica gel (Silicar CC–4) eluting successively with 125 ml. of 40% ethyl acetate in cyclohexane, 125 ml. of 60% ethyl acetate in cyclohexane, and 125 ml. of ethyl acetate, collecting 25-ml. fractions. The fractions corresponding to the 100% ethyl acetate eluate are combined and evaporated to give 412 mg. of residue.

A cation exchange resin (25 g.; Amberlyst-15) is washed four times with warm water and then packed as an aqueous slurry into a 100-ml. burette tube. The column is washed with 10% aqueous silver nitrate solution until the pH of the effluent is 3.5. The column is washed free of excess silver ion with water, and then the water in the column is washed out with ethanol. A solution of the above-mentioned residue (412 mg.) in 3 ml. of ethanol is applied to the column, which is then eluted successively with 75 ml. of ethanol and 25 ml. of 10% cyclohexene in ethanol at a flow rate of 0.5 ml. per minute. The first 30 ml. of eluate is evaporated to give 206 ml. of 5,6-trans-$PGE_2$. The next 45 ml. of eluate is evaporated to give 175 mg. of a mixture of 5,6-trans-$PGE_2$ and $PGE_2$. That mixture is chromatographed on the same column with prior washing of the column with ethanol, eluting as before with ethanol. The first 30 ml. of eluate from this second chromatography is evaporated to give 85 mg. of 5,6-trans-$PGE_2$.

The combined amounts of 5,6-trans-$PGE_2$ are chromatographed on 20 g. of acid-washed silica gel (Silicar CC–4), eluting successively with 125 ml. each of 20%, 40%, 60%, 80%, and 100% ethyl acetate in cyclohexane. The eluates corresponding to the 80% and 100% ethyl acetate are combined and evaporated to give 166 mg. of residue. The residue is recrystallized from a mixture of diethyl ether and Skellysolve B (a mixture of isomeric hexanes) to give 108 mg. of 5,6-trans-$PGE_2$ in the form of colorless plates; melting range 75–77° C.; infrared spectral absorption at 3340, 3160, 1730, 1710 sh, 1250, 1170, 1080, 1075, and 960 cm.$^{-1}$.

Following the procedure of Example 1, the methyl, ethyl, isopropyl, tert-butyl, and 2-ethylhexyl esters of $PGE_2$ are each isomerized to the corresponding esters of 5,6-trans-$PGE_2$.

Following the procedure of Example 1, but replacing $PGE_2$ with $15\beta$-$PGE_2$, there is obtained 5,6-trans-$15\beta$-$PGE_2$. Likewise replacing $PGE_2$ with dl-$PGE_2$, there is obtained dl-5,6-trans-$PGE_2$.

EXAMPLE 2 dl-5,6-trans-$PGE_2$, methyl ester

Following the procedure of Example 1, the methyl ester of dl-$PGE_2$ is isomerized to the methyl ester of dl-5,6-trans-$PGE_2$ (high resolution mass spectrum: M$^+$-18: 348.2284 and peaks at 335, 330, 317, and 277).

Following the procedure of Example 1, the ethyl, isopropyl, tert-butyl, and 2-ethylhexyl esters of dl-$PGE_2$ are each isomerized to the corresponding esters of dl-5,6-trans-$PGE_2$.

EXAMPLE 3 dl-5,6-trans-$15\beta$-$PGE_2$ and its methyl ester

Following the procedure of Example 1, dl-$15\beta$-$PGE_2$ (obtained from the trichloroethyl ester of dl-$15\beta$-$PGE_2$ by treatment with zinc in acetic acid, see W. P. Schneider, Chem. Commun., 304–305, Mar. 19, 1969) is isomerized to dl-5,6-trans-$15\beta$-$PGE_2$. Esterification with diazomethane in diethyl ether, thereafter removing the solvent, yields the methyl ester of dl-5,6-trans-15β-PGE$_2$ (high resolution mass spectrum: M$^+$-18: 348.2272 and peaks at 330, 317, 299, and 277).

Alternatively, dl-15β-PGE$_2$ is esterified with diazomethane in diethyl ether, and the resulting methyl ester of dl-15β-PGE$_2$ is then isomerized following the procedure of Example 1 to the methyl ester of dl-5,6-trans-15β-PGE$_2$ having the same properties reported above.

Following the procedure of Example 1, the ethyl isopropyl, tert-butyl, and 2-ethylhexyl esters of dl-15β-PGE$_2$ are each isomerized to the corresponding esters of dl15,6-trans-15β-PGE$_2$.

EXAMPLE 4

5,6-trans-PGF$_{2\alpha}$ and 5,6-trans-PGF$_{2\beta}$

A cold (0° C.) solution of sodium borohydride (200 mg.) in 10 ml. of methanol is added rapidly to a stirred solution of 5,6-trans-PGE$_2$ (75 mg.) in 5 ml. of methanol at 0° C. The mixture is stirred 30 minutes at 0° C. and then 30 minutes while warming to 25° C. The mixture is evaporated to half its volume, diluted with 10 ml. of water, and then evaporated until methanol has been removed. The resulting mixture is acidified with one N hydrochloric acid and then extracted 3 times with ethyl acetate. The combined extracts are washed with water, dried, and evaporated. The residue is chromatographed on 10 g. of acid-washed silica gel (Silicar CC-4), eluting successively with 50 ml. of 50% ethyl acetate in cyclohexane, 140 ml. of ethyl acetate, and 60 ml. of ethyl acetate containing 1% acetic acid and 2% methanol, collecting 10-ml. fractions. Fractions 9–14 are combined and evaporated to give 20 mg. of 5,6-trans-PGF$_{2\alpha}$; melting point 95–96° C. after two crystallizations from diethyl ether. Fractions 16–24 are combined and evaporated to give 34 mg. of 5,6-trans-PGF$_{2\beta}$; identical on TLC with the product of Example 5, below.

Following the procedure of Example 4, the methyl, ethyl, isopropyl, tert-butyl, and 2-ethylhexyl esters of 5,6-trans-PGE$_2$ are each reduced to the corresponding esters of a mixture of 5,6-trans-PGF$_{2\alpha}$ and 5,6-trans-PGF$_{2\beta}$, the components of each such mixture being separated as described in Example 4.

Thus, from 5,6-trans-PGE$_2$ methyl ester there is obtained 5,6-trans-PGF$_{2\beta}$, methyl ester, m.p. 70° C., infrared spectral absorption at 3300, 3200, 1740, 1320, 1195, 1175, 1150, 1075, 1040, 1020, and 970 cm.$^{-1}$, mass spectral peaks at 368 (M$^+$), 350, 332, and 278.

Following the procedure of Example 4, 5,6-trans-15β-PGE$_2$ and the methyl, ethyl, isopropy, tert-butyl, and 2-ethylhexyl esters of 5,6-trans-15β-PGE$_2$ are each transformed to the corresponding free acid and esters of a mixture of 5,6-trans-15β-PGF$_{2\alpha}$ and 5,6-trans-15β-PGF$_{2\beta}$, the components of each such mixture being separated by the procedures described in Example 4.

Following the procedure of Example 4, dl-5,6-trans-PGE$_2$ and the methyl, ethyl, isopropyl, tert-butyl, and 2-ethylhexyl esters of dl-5,6-trans-PGE$_2$ are each reduced to the corresponding free acid and esters of a mixture of dl-5,6-trans-PGF$_{2\alpha}$ and dl-5,6-trans-PGF$_{2\beta}$, the components of each such mixture being separated by the procedures described in Example 4.

Following the procedure of Example 4, dl-5,6-trans-15β-PGE$_2$ and the methyl, ethyl, isopropyl, tert-butyl, and 2-ethylhexyl esters of dl-5,6-trans-15β-PGE$_2$ are each reduced to the corresponding free acid and esters of a mixture of dl - 5,6 - trans-15β-PGF$_{2\alpha}$ and dl-5,6-trans-15β-PGF$_{2\beta}$, the components of each such mixture being separated by the procedures in Example 4.

EXAMPLE 5

5,6-trans-PGF$_{2\beta}$

A solution of PGF$_{2\beta}$ (1.00 g.) and diphenyl sulfide (1.00 g.) in a mixture of methanol (10 ml.) and benzene (100 ml.) is irradiated for 24 hours at 25° C. as described in Example 1. The reaction mixture is evaporated under reduced pressure, and the residue is chromatographed on 50 g. of acid-washed silica gel (Silicar CC-4), eluting successively with 250 ml. 40% ethyl acetate in cyclohexane, 250 ml. 60% ethyl acetate in cyclohexane, 350 ml. ethyl acetate, and 250 ml. of ethyl acetate containing 1% acetic acid and 3% methanol, collecting 50-ml. fractions. Fractions 18–22 corresponding to the last eluent are combined and evaporated to give 803 mg. of a residue which is chromatographed on a silver-loaded cation exchange resin prepared as described in Example 1 from 50 g. of resin, eluting with ethanol. The first 200 ml. of eluate is evaporated to give 400 mg. of 5,6-trans-PGE$_{2\beta}$. That is chromatographed on 40 g. of acid-washed silica gel (Silicar CC-4), eluting successively with 250 ml. 60% ethyl acetate in cyclohexane, 100 ml. 80% ethyl acetate in cyclohexane 500 ml. ethyl acetate, and 200 ml. ethyl acetate containing 1% acetic acid and 2% methanol, collecting 50-ml. fractions. Fractions 11–21 are combined and evaporated to give 316 mg. 5,6-trans-PGF$_{2\beta}$; melting range 68–69° C. after crystallization from diethyl ether and recrystallization from a mixture of acetone and Skellysolve B; infrared spectral absorption (mineral oil mull) at 3270, 3180 sh, 1710, 1315, 1300, 1255, 1205, 1075, 1065, 1040, 1020, 970, and 930 cm.$^{-1}$.

Following the procedure of Example 5, the methyl, ethyl, isopropyl, tert-butyl, and 2-ethylhexyl esters of PGF$_{2\beta}$ are each isomerized to the corresponding esters of 5,6-trans-PGF$_{2\beta}$, each of those being identical with the ester prepared by carbonyl reduction as described above.

EXAMPLE 6

5,6-trans-PGF$_{2\alpha}$

Following the procedure of Example 5, PGF$_{2\alpha}$ (175 mg.) is isomerized to 5,6-trans-PGF$_{2\alpha}$ (40 mg.) identical with that obtained in Example 4.

Also following the procedure of Example 5, the methyl, ethyl, isopropyl, tert-butyl, and 2-ethylhexyl esters of PGF$_{2\alpha}$, are each isomerized to the corresponding esters of 5,6-trans-PGF$_{2\alpha}$, each of those being identical with the ester prepared by carbonyl reduction as described above.

EXAMPLE 7

5,6-trans-PGA$_2$

A solution of 5,6-trans-PGE$_2$ (500 mg.) in a mixture of glacial acetic acid (9 ml.) and water (1 ml.) is heated under nitrogen at 60° C. for 18 hours. Then, the acetic acid and water are evaporated under reduced pressure, and the residue is chromatographed on 50 g. of acid-washed silica gel, eluting with a 25–100% gradient of ethyl acetate in Skellysolve B. The fractions containing the desired product free of starting material as shown by TLC are combined and evaporated to give 5,6-trans-PGA$_2$. Infrared spectral absorption at 3380, 2640, 1705, 1585, 1295, 1240, 1180, 1150, 1015, and 970 cm.$^{-1}$. High resolution mass spectral data for trimethylsilylated compound: M$^+$ 478.2998.

Following the procedure of Example 7, the methyl, ethyl, isopropyl, tert-butyl, and 2-ethylhexyl esters of 5,6-trans-PGE$_2$ are each transformed to the corresponding ester of 5,6-trans-PGA$_2$.

Following the procedure of Example 7, 5,6-trans-15β-PGE$_2$ and the methyl, ethyl, isopropyl, tert-butyl, and 2-ethylhexyl esters of 5,6-trans-15β-PGE$_2$ are each transformed to the corresponding free acid and esters of 5,6-trans-15β-PGA$_2$.

Following the procedure of Example 7, dl-5,6-trans-PGE$_2$ and the methyl, ethyl, isopropyl, tert-butyl, and 2-ethylhexyl esters of dl-5,6-trans-PGE$_2$ are each transformed to the corresponding free acid and esters of dl-5,6-trans-PGA$_2$.

Following the procedure of Example 7, dl-5,6-trans-15β-PGE$_2$ and the methyl, ethyl, isopropyl, tert-butyl, and 2-ethylhexyl esters of dl - 5,6 - trans - 15β - PGE$_2$ are each transformed to the corresponding free acid and esters of dl-5,6-trans-15β-PGA₂.

EXAMPLE 8

5,6-trans-PGB₂

A solution of 5,6-trans-PGE₂ (200 mg.) in 100 ml. of 50% aqueous ethanol containing 1.5 grams of potassium hydroxide is kept at 25° C. for 10 hours under nitrogen. Then, the solution is cooled to 10° C. and neutralized by addition of 3 normal hydrochloric acid at 10° C. The resulting solution is extracted repeatedly with ethyl acetate, and the combined ethyl acetate extracts are washed with water and then with brine, dried, and evaporated to give 5,6-trans-PGB₂.

Following the procedure of Example 8, 5,6-trans-PGA₂ is transformed to 5,6-trans-PGB₂ with properties identical to those of the compound obtained in Example 8.

Also following the procedure of Example 8, the methyl, ethyl, isopropyl, tert-butyl, and 2-ethylhexyl esters of 5,6-trans-PGE₂ and 5,6-trans-PGA₂ are each transformed to the corresponding ester of 5,6-trans-PGB₂.

Following the procedure of Example 8, 5,6-trans-15β-PGE₂ and the methyl, ethyl, isopropyl, tert-butyl, and 2-ethylhexyl esters of 5,6-trans-15β-PGE₂ are each transformed to the corresponding free acid and esters of 5,6-trans-15β-PGB₂.

Following the procedure of Example 8, dl-5,6-trans-PGE₂ and the methyl, ethyl, isopropyl, tert-butyl, and 2-ethylhexyl esters of dl-5,6-trans-PGE₂ are each transformed to the corresponding free acid and esters of dl-5,6-trans-PGB₂.

Following the procedure of Example 8, dl-5,6-trans-15β-PGE₂ and the methyl, ethyl, isopropyl, tert-butyl, and 2-ethylhexyl esters of dl - 5,6 - trans-15β-PGE₂ are each transformed to the corresponding free acid and esters of dl-5,6-trans-15β-PGB₂.

EXAMPLE 9

5,6-trans-PGE₂, 11,15-diacetate 5,6-trans-PGE₂ (10 mg.) is mixed with acetic anhydride (2 ml.) and pyridine (2 ml.). The resulting mixture is left standing at 25° C. for 18 hours. The reaction mixture is then cooled externally with ice, diluted with water, and acidified with dilute hydrochloric acid to pH 1. That mixture is extracted three times with diethyl ether. The combined extracts are washed successively with dilute hydrochloric acid, dilute aqueous sodium bicarbonate solution, and water, dried, and evaporated to give the title compound.

Following the procedure of Example 9, but using in place of the free acid 5,6-trans-PGE₂ compound the methyl, ethyl, isopropyl, tert-butyl, and 2-ethylhexyl esters of 5,6-trans-PGE₂, there are obtained the corresponding diacetates.

Following the procedure of Example 9, but using propionic anhydride, isobutyric anhydride, and hexanoic anhydride each in place of the acetic anhydride, there are obtained the corresponding dipropionate, diisobutyrate, and dihexanoate of 5,6-trans-PGE₂, methyl ester.

Following the procedure of Example 9, but replacing 5,6-trans-PGE₂ with 5,6-trans-15β-PGE₂ and its methyl, ethyl, isopropyl, tert-butyl, and 2-ethylhexyl esters, there are obtained the corresponding diacetates.

Following the procedure of Example 9, dl-5,6-trans-PGE₂ and dl-5,6-trans-15β-PGE₂ and their methyl, ethyl, isopropyl, tert-butyl and 2-ethylhexyl esters are transformed to the corresponding diacetates.

Following the procedure of Example 9, 5,6-trans-PGF₂α, 5,6-trans-PGF₂β, 5,6-trans-15β-PGF₂α, 5,6 - trans - 15β-PGF₂β, and their methyl, ethyl, isopropyl, tert-butyl, and 2-ethylhexyl esters are transformed to the corresponding triacetates.

Also following the procedure of Example 9, but replacing 5,6-trans-PGE₂ with 5,6-trans-PGA₂, 5,6-trans-15β-PGA₂, 5,6-trans-PGB₂, 5,6-trans-15β-PGB₂, and their methyl, ethyl, isopropyl, tert-butyl, and 2-ethylhexyl esters are transformed to the corresponding monoacetates.

EXAMPLE 10

5,6-trans-PGA₂, formate, methyl ester

Following the general procedures of Staab et al., Ann., 655, 95 (1962), 5,6-trans-PGA₂ methyl ester is transformed to 5,6-trans-PGA₂, formate, methyl ester.

Following the procedure of Example 10, 5,6-trans-PGF₂α, 5,6-trans-PGF₂β, 5,6-trans-15β-PGF₂α, 5,6-trans-15β-PGF₂β, and their methyl, ethyl, isopropyl, tert-butyl, and 2-ethylhexyl esters are transformed to the corresponding triformates.

Following the procedure of Example 10, 5,6-trans-PGE₂, 5,6-trans-15β-PGE₂, dl - 5,6 - trans-PGE₂, dl-5,6-trans-15β-PGE₂, and their methyl, ethyl, isopropyl, tert-butyl and 2-ethylhexyl esters are transformed to the corresponding diformates.

Also following the procedure of Example 10, 5,6-trans-PGB₂ is transformed to the corresponding formate.

EXAMPLE 11

5,6-trans-15β-PGA₂

Following the procedure of Preparation 4, but using a fraction containing 15β-PGA₂ obtained from *Plexura homomalla* (Esper), 1792, forma R, following the procedure of Preparation 2, there is obtained the title compound, having infrared spectral absorptions at 3400 broad, 2650, 1725, 1705, 1585, 1240, 1175, 1045, 1020, and 970.

What is claimed is:

1. An optically active compound of the formula

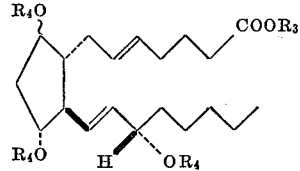

or a racemic compound of that formula and the mirror image thereof, wherein $R_3$ is hydrogen or alkyl of one to 8 carbon atoms, wherein all $R_4$'s are hydrogen, formyl, or alkanoyl of 2 to 8 carbon atoms, inclusive, and wherein ~ indicates attachment of hydroxy to the cyclopentane ring in alpha or beta configuration; and the pharmacologically acceptable salts thereof when $R_3$ is hydrogen.

2. 5,6-trans-PGF₂α, an optically active compound according to claim 1 wherein $R_3$ and $R_4$ are hydrogen, and ~ is alpha.

3. 5,6-trans-PGF₂β, an optically active compound according to claim 1 wherein $R_3$ and $R_4$ are hydrogen, and ~ is beta.

4. 5,6-trans-PGF₂β methyl ester, an optically active compound according to claim 1 wherein $R_3$ is methyl, $R_4$ is hydrogen, and ~ is beta.

5. dl-5,6-trans-PGF₂α, a racemic compound according to claim 1 wherein $R_3$ and $R_4$ are hydrogen, and ~ is alpha.

6. dl-5,6-trans-PGF₂β, a racemic compound according to claim 1 wherein $R_3$ and $R_4$ are hydrogen, and ~ is beta.

7. An optically active compound of the formula

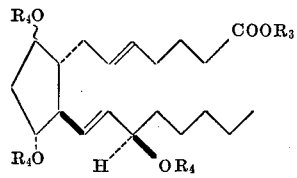

or a racemic compound of that formula and the mirror image thereof, wherein $R_3$ is hydrogen or alkyl of one to 8 carbon atoms, wherein all $R_4$'s are hydrogen, formyl, or alkanoyl of 2 to 8 carbon atoms, inclusive, and wherein ∼ indicates attachment of hydroxy to the cyclopentane ring in alpha or beta configuration; and the pharmacologically acceptable salts thereof when $R_3$ is hydrogen.

8. 5,6-trans-15β-PGF$_{2\alpha}$, an optically active compound according to claim 7 wherein $R_3$ and $R_4$ are hydrogen, and ∼ is alpha.

9. 5,6-trans-15β-PGF$_{2\beta}$, an optically active compound according to claim 7 wherein $R_3$ and $R_4$ are hydrogen, and ∼ is beta.

10. dl-5,6-trans-15β-PGF$_{2\alpha}$, a racemic compound according to claim 7 wherein $R_3$ and $R_4$ are hydrogen, and ∼ is alpha.

11. dl-5,6-trans-15β-PGF$_{2\beta}$, a racemic compound according to claim 7 wherein $R_3$ and $R_4$ are hydrogen, and ∼ is beta.

References Cited

Beerthuis et al.: Rec. Trav. Chim. *90*, 943 (1971).

ROBERT GERSTL, Primary Examiner

U.S. Cl. X.R.

260—211 R, 247.2 R, 268 R, 293.65, 326.3, 410, 424.8, 439 R, 448 R, 488 R, 501.1, 501.15, 501.17, 501.2, 514 D

UNITED STATES PATENT AND TRADEMARK OFFICE
CERTIFICATE OF CORRECTION

PATENT NO. : 3,823,180
DATED : July 9, 1974
INVENTOR(S) : Frank H. Lincoln, Jr. and John E. Pike It is certified that error appears in the above-identified patent and that said Letters Patent are hereby corrected as shown below:

Column 1, line 54, "racemic" should read -- organic --. Column 15, line 4, "Fiester" should read -- Fieser --. Column 21, line 12, "dl15,6-trans-" should read -- dl-5,6-trans- --. Column 22, line 13, "$PGE_{2\beta}$" should read -- $PGF_{2\beta}$ --.

Signed and Sealed this

Thirteenth Day of July 1976

[SEAL]

Attest:

RUTH C. MASON
Attesting Officer

C. MARSHALL DANN
Commissioner of Patents and Trademarks